No. 837,829. PATENTED DEC. 4, 1906.
C. F. HAWLEY.
AMALGAM TRAP.
APPLICATION FILED JAN. 21, 1905. RENEWED JULY 18, 1906.
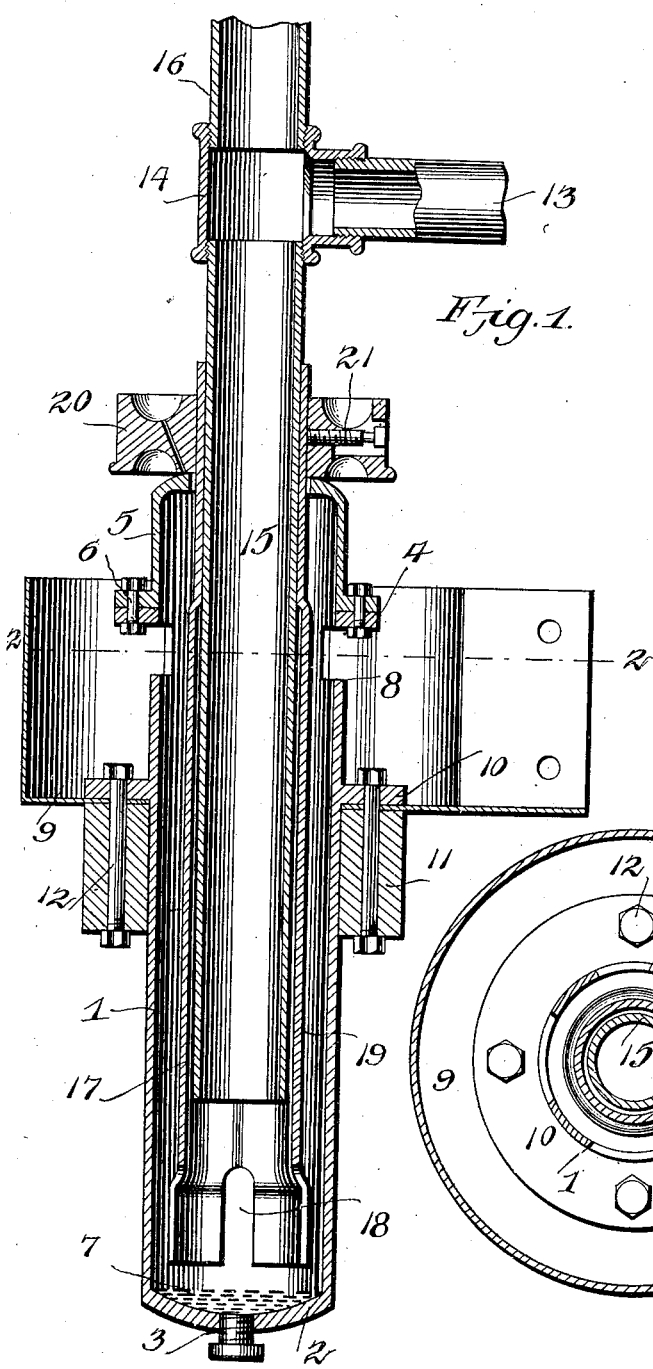
Witnesses
Frank W. Hough
C. C. Hiser
Inventor
C. F. Hawley.
By Victor J. Evans
Attorney.

UNITED STATES PATENT OFFICE.

CHARLES F. HAWLEY, OF PORTLAND, OREGON.

AMALGAM-TRAP.

No. 837,829.  Specification of Letters Patent.  Patented Dec. 4, 1906.

Application filed January 21, 1905. Renewed July 18, 1906. Serial No. 326,769.

*To all whom it may concern:*

Be it known that I, CHARLES F. HAWLEY, a citizen of the United States, residing at Portland, in the county of Douglass and State of Oregon, have invented new and useful Improvements in Amalgam-Traps, of which the following is a specification.

This invention relates to a mercury or amalgam trap for use in connection with reduction-mills or other apparatus for recovering precious metals from their sands or ores.

The object of the invention is to provide a trap of this character in which provision is made for the rapid and efficient recovery of the metal and the discharge of the pulp without undue friction or resistance.

With this and other objects in view the invention consists of the features of construction, combination, and arrangement of parts hereinafter fully described and claimed, reference being had to the accompanying drawings, in which—

Figure 1 a central vertical longitudinal section of a mercury or amalgam trap embodying my invention, and Fig. 2 is a horizontal cross-section of the same on the line 2 2 of Fig. 1.

Referring now more particularly to the drawings, the numeral 1 represents a trap consisting of a substantially cylindrical body or vessel having a closed lower end 2 provided with a drain-plug 3 and formed at its upper end with a flange 4, serving as a support for the flanged base of an upper cap or head 5, which is fixed to the flange 4 by bolts 6 or other suitable securing devices. The closed bottom or head 2 is dished or otherwise formed to provide a cup for the reception of the mercury 7, and the upper end of the trap is provided immediately below the flange 4 with outlets 8 for the discharge of the pulp. The pulp discharges through the outlets 8 into a receiving pan or hopper 9, which is arranged to surround the upper portion of the trap and is clamped between a flange 10 thereon and a block 11 therebelow, bolts 12 passing through said parts and securing them firmly together.

The pulp feeds to the trap 1 through a feed-pipe 13, connected by a coupling 14 to the upper end of a delivery-pipe 15. This pipe 15 extends downward through the head 5 into the trap and has its lower end terminating at a suitable point between the center of the trap and the body of mercury 7. Arranged in line with the pipe 15 and connected thereto by the coupling 14 is a pipe-section 16, which is designed to be suitably secured at its upper end to a frame or other stationary support and serves also as a medium by which mercury may be supplied to the tube 15 to be conducted to the bottom of the trap 1. The block 11 is also designed to be secured to some stationary support to hold the trap and pulp-receiving pan in fixed relation to the said pipe 15.

Inclosing the pipe 15 for a portion of its length is a rotary agitating-tube 17, which projects at its lower end below the tube 15 and to a point slightly above the body of mercury in the trap, it being formed at its lower end with outlet-passages 18, through which the pulp delivered by the pipe 15 feeds to the space or passage 19 between the said tube 17 and the wall of the trap 1, which space or passage communicates at its upper end with the discharging-outlets 8. The upper end of the tube 17 fits snugly about the pipe 15 and projects upward to the exterior through an opening in the head 5, in which it freely turns. A pulley 20 surrounds the upper end of the tube 17 and rests upon the head 5 and is secured to said tube by a set-screw 21. Motion may be communicated to this pulley by a belt from a suitable source of power to rotate the agitating-tube, and the latter may be adjusted vertically to regulate the position of its lower end with respect to the body of mercury in the trap by slackening up the set-screw and adjusting the agitating-tube up or down, as desired, after which the tube may be held in adjusted position by tightening up the screw. From a point above the plane of the outlets 8 of the trap and thence downwardly the tube 17 is of greater diameter than the pipe 15, thus allowing it to turn more freely and preventing the outflowing body or column of pulp feeding upward through the passage 19 from pressing the same against the pipe 15 and increasing resistance to its operation. The upper end of the tube 17 turns upon the pipe 15 as an axis, so that the tube 17 when rotated will agitate the pulp, and its lower ported end will form a stirrer which will constantly turn over the particles of the pulp, and thereby cause the precious metal to be quickly taken up by the mercury.

In operation the pulp feeds from the pipe 13 into the pipe 15 and passes downward through the latter to the lower end of the trap, where it comes in contact with the body of mercury, the pulp being agitated by the lower end of the tube 17 and passing from the base of the trap upward through the space or channel 19 and finally passing through the outlets 8 into the receiving-pan 10. In its passage the pulp is so turned over or agitated by the agitating-tube that a greater percentage of the precious particles are abstracted, a more efficient action to this end being obtained than with devices of that kind in which the pulp simply comes in contact in a mass or body with the mercury. If desired, however, the pulp may be fed through the trap without operating the agitator; but it is preferred during the amalgamating operation, for reasons stated, to keep the agitator in constant action.

From the foregoing description, taken in connection with the accompanying drawings, the construction and mode of operation of the invention will be understood without a further extended description.

Changes in the form, proportions, and minor details of construction may be made within the scope of the invention without departing from the spirit or sacrificing any of the advantages thereof.

Having thus described the invention, what is claimed as new is—

1. In a device of the character described, the combination of a receiving-pan, a trap-body having a mercury-cup at its lower end and outlets at its upper end, the latter communicating with the pan, a feed-tube projecting into the trap-body to a point below the outlets and terminating above the mercury-cup, a rotary tube surrounding the feed-tube and projecting below the same into the mercury-cup, the projecting lower end of said tube forming an agitator and the tube being spaced from the trap-body to form an intervening passage for the upward feed of the pulp from the trap-body to the outlets, and means for rotating the said rotary tube.

2. In a device of the character described, the combination of a receiving-pan, a trap-body having a mercury-cup at its lower end and outlets at its upper end, the latter communicating with the pan, a feed-tube projecting into the trap-body and terminating at its lower end above the mercury-cup, a rotary tube surrounding the feed-tube and projecting below the same and carrying at its lower end an agitator operating within the cup, said tube being spaced from the trap-body to provide a passage for the upward feed of the pulp from the mercury-cup to the outlets and also spaced from the feed-tube entirely along the length of said passage, and means for rotating the said rotary tube.

3. In a device of the character described, the combination of a receiving-pan, a trap-body having a mercury-cup at its lower end and outlets at its upper end, the latter communicating with the pan, a feed-tube projecting into the trap-body and terminating above the cup, a rotary tube surrounding said feed-tube and projecting below the same, the lower end of said tube being slotted to form passages and agitator-blades, the tube being spaced from the trap-body to form a feed-passage for the pulp between the mercury-cup and the outlets, and means for rotating the said rotary tube.

4. In a mercury-trap, a trap-body having an outlet at its upper end, and a mercury-cup at its lower end, a conductor-pipe extending into said trap and terminating above the mercury-cup, a rotary agitator turning on said pipe and extending below the same, the lower portion of said agitator being spaced from said pipe, and means for rotating the agitator.

5. In a mercury-trap, a trap-body having a mercury-cup at its lower end and outlets at its upper end, a feed-tube projecting into the trap-body, a rotary tube surrounding the feed-tube and projecting below the same, said tube being provided at its lower end with an agitator acting within the cup, means for adjusting said tube to raise and lower the agitator within the cup, and means for rotating the tube.

6. In a device of the character described, the combination of a receiving-pan, a trap-body having a mercury-cup at its lower end and outlets at its upper end, the latter communicating with the pan, a feed-tube projecting into the trap-body and terminating above the cup, a rotary tube surrounding the feed-tube and projecting below the same and having its lower end provided with an agitator operating within the cup, said rotary tube being spaced from the trap-body to form a passage for the upward feed of the pulp from the mercury-cup to the outlets and also spaced from the feed-tube along the entire length of said passage, means for adjusting the rotary tube to regulate the elevation of the agitator within the mercury-cup, and means for rotating said feed-tube.

In testimony whereof I affix my signature in presence of two witnesses.

CHARLES F. HAWLEY.

Witnesses:
JOHN W. COOK,
FRED K. HUNGERFORD.